United States Patent [19]
Koshinski

[11] Patent Number: 6,038,987
[45] Date of Patent: Mar. 21, 2000

[54] METHOD AND APPARATUS FOR REDUCING THE CARBON CONTENT OF COMBUSTION ASH AND RELATED PRODUCTS

[75] Inventor: Casmir J. Koshinski, Ambridge, Pa.

[73] Assignee: Pittsburgh Mineral and Environmental Technology, Inc., New Brighton, Pa.

[21] Appl. No.: 09/228,630

[22] Filed: Jan. 11, 1999

[51] Int. Cl.[7] .............................. B07B 4/00; B07B 7/00; F23J 3/00; C04B 14/00

[52] U.S. Cl. .................... 110/344; 110/342; 110/165 A; 106/705; 106/756; 106/757; 106/DIG. 1; 95/271; 95/269; 55/459.1; 55/460

[58] Field of Search ........................... 110/165 A, 165 R, 110/341, 342, 344; 95/269, 271; 55/459.1, 460; 106/705, 756, 757, DIG. 1

[56] References Cited

U.S. PATENT DOCUMENTS

| | | |
|---|---|---|
| 3,669,703 | 6/1972 | Pennachetti et al. . |
| 3,769,054 | 10/1973 | Pennachetti et al. . |
| 4,115,256 | 9/1978 | de Zeeuw . |
| 4,121,945 | 10/1978 | Hurst et al. . |
| 4,249,954 | 2/1981 | Keogh ........................................ 106/97 |
| 4,260,478 | 4/1981 | Hosokawa et al. . |
| 4,292,172 | 9/1981 | Hosokawa et al. . |
| 4,357,234 | 11/1982 | Inculet et al. . |
| 4,426,282 | 1/1984 | Aunsholt . |
| 4,514,289 | 4/1985 | Inculet . |
| 4,517,078 | 5/1985 | Inculet et al. . |
| 4,550,879 | 11/1985 | Tanaka et al. . |
| 4,556,481 | 12/1985 | Hepher . |
| 5,047,145 | 9/1991 | Hwang . |
| 5,160,539 | 11/1992 | Cochran . |
| 5,188,237 | 2/1993 | Schwamborn . |
| 5,227,047 | 7/1993 | Hwang . |
| 5,299,692 | 4/1994 | Nelson et al. . |
| 5,377,843 | 1/1995 | Schumacher . |
| 5,390,611 | 2/1995 | John . |
| 5,399,194 | 3/1995 | Cochran et al. . |
| 5,423,490 | 6/1995 | Zampini . |
| 5,513,808 | 5/1996 | Romero-Vargas ..................... 241/24.1 |
| 5,555,821 | 9/1996 | Martinez . |
| 5,667,075 | 9/1997 | Konetzka . |
| 5,797,496 | 8/1998 | Kirchen et al. . |

FOREIGN PATENT DOCUMENTS

| | | |
|---|---|---|
| 2710557 A1 | 4/1995 | France . |
| 1-19440 | 4/1989 | Japan . |

OTHER PUBLICATIONS

Tamashige T., Fujii S., Ogawa K., Kamakura H., Experiences in separation of residual carbon in coal fly ash by grinding and air classification, *Advanced Materials '93*, V/A: Ecomaterials, Trans. Mat. Res. Soc. Jpn., vol. 18A 1994 Elsevier Science B.V.

Groppo J.G., Brooks S.M., Kreiser C., Fly Ash Beneficiation by Air Classification, *Society for Mining, Metallurgy, and Exploration, Inc.*, Preprint No. 95–196.

*Primary Examiner*—Ira S. Lazarus
*Assistant Examiner*—Ljiljana V. Ciric
*Attorney, Agent, or Firm*—Eckert Seamans Cherin & Mellott, LLC

[57] ABSTRACT

A method for reducing the carbon content of a combustion ash containing siliceous ash particles and carbon particles includes subjecting the combustion ash to comminution to reduce the particle size of the siliceous ash particles and the carbon particles followed by separating a portion of the carbon particles from the siliceous ash particles by subjecting the comminuted ash to a flow of gas which separates the carbon particles from the siliceous ash particles. The method preferably is performed in a unitary housing by employing autogenous grinding to effect the comminution of the particles and employing a classifying rotor to separate the comminuted portion of the carbon particles based on the density differential between the siliceous ash particles and the carbon particles. A method of making a concrete mixture employing the obtained combustion ash with reduced carbon content is also provided. An apparatus for reducing the carbon content of the combustion ash is also provided.

16 Claims, 5 Drawing Sheets

METHOD AND APPARATUS FOR REDUCING THE CARBON CONTENT OF COMBUSTION ASH AND RELATED PRODUCTS

BACKGROUND OF THE INVENTION

This invention relates to a method for reducing the carbon content of siliceous combustion ash and related products and a related apparatus. More specifically, the invention relates to a method for removing carbon from coal combustion fly ash or similar materials in a manner that improves the pozzolanic properties of the resultant ash and products related thereto and a related apparatus.

It is well known that fine siliceous ash, especially fly ash resulting from coal combustion, has found widespread commercial use as a substitute for Portland cement in concrete because of the pozzolanic properties of such ash. The use of siliceous ash in this application requires that the carbon content of the ash be generally less than 6% by weight and preferably 4% or less by weight in order to obtain the required pozzolanic properties. This requirement results from the fact that the properties of concrete incorporating high-carbon ash are inferior to those of concrete incorporating low-carbon ash and the amount of water and quantity of air entraining agents used in the mix must be increased significantly as the carbon content of the ash increases above the 6% level.

It is also well known that the implementation of more stringent air quality regulations pertaining to coal-burning power plants and other industrial combustion operations has resulted in the installation and use of combustion gas purification technologies including burners that generate lower levels of nitrogen oxides in the combustion gases discharged to the atmosphere (low NOx burners). The use of such burners significantly increases the carbon content and alters the characteristics and pozzolanic properties of the resulting ash. The application of these new burners has significantly decreased the quantity of available ash that is suitable for use as a constituent in concrete and shaped building products.

The amount, size, and shape of the carbon particles, the quantity of carbon particles trapped within or tightly adhered to the siliceous particles in the ash, the quantity of siliceous particles trapped within or tightly adhered to carbon particles within the ash, and the pozzolanic properties of the siliceous particles within an ash vary widely from ash-to-ash depending upon the composition of the coal and the combustion parameters and pollution technology employed in its combustion. Optimum carbon removal from a given ash requires removal of a significant portion of the free carbon particles from the ash, liberation and removal of a portion of the entrapped or tightly adhered carbon particles, liberation and retention of the entrapped or tightly adhered siliceous particles, and minimizing the quantity of siliceous material removed along with the carbon.

A number of methods and apparatus have been developed and commercialized for use in removing carbon particles from fly ash, including methods based upon combustion of the carbon and those based upon removal of the carbon particles by mechanical, electrostatic, gravitational, and flotational means and combinations thereof.

Combustion means for removing carbon from fly ash by thermally oxidizing a significant portion of the free carbon in the ash via heating in an atmosphere of air and/or oxygen are described in U.S. Pat. No. 5,555,821, and U.S. Pat. No. 5,390,611. Similarly, U.S. Pat. No. 5,160,539 and U.S. Pat. No. 5,399,194, disclose reducing the carbon content in fly ash by introducing the fly ash/carbon mixture into a dry bubbling fluid bed and supplying air thereto at temperatures sufficient to combust the carbon. All of these thermal methods, although effective in reducing the amount of carbon present in the fly ash, are energy intensive, involve costly material handling procedures, and reduce the possibility of recovering any carbon values from the ash.

Mechanical means of removing carbon from siliceous ash based upon the relative particle size of the carbon particles and the siliceous particles in the ash is disclosed in U.S. Pat. No. 5,797,496 which discloses the separation of the coarser carbon particles from the finer siliceous particles by passing the fly ash mixture through screens of varying mesh size.

A gravitational means for removing carbon from a siliceous ash/carbon mixture disclosed by Groppo, J. G., Brooks, S. M., and Krieser ("Fly Ash Beneficiation By Air Classification ("Fly Ash Beneficiation By Air Classification", SME Annual Meeting, March, 1995) involves subjecting the mixture to an air stream in which the larger, less dense carbon particles are separated from the smaller, more dense siliceous particles. Other gravitational separation means are described in U.S. Pat. No. 3,769,054 which discloses subjecting a fly ash/carbon mixture to air classification in order to achieve a low-carbon fraction and a high-carbon fraction and screening the high-carbon fraction, and U.S. Pat. No. 5,299,692 which discloses a separation method based upon vibrating a fly ash/carbon mixture on an inclined surface to cause the light high-carbon fraction to rise to the top and the heavy-low carbon siliceous fraction to gravitate to the bottom of the mixture while subjecting the top of the mixture to a directional flow of air that removes the high-carbon fraction from the mixture and causes it to be collected in collection chambers. A two-stage process for removing carbon from the coarse fly ash fraction resulting from an initial air classification of an as-combusted ash, reported in the "Transactions, Materials Research Society of Japan, Volume 18A" ("Experiences in Separating Residual Carbon in Coal Fly Ash by Grinding and Air Classification"), involves subjecting the high-carbon coarse fraction from the initial air classification step to a second step in which mechanical grinding is combined with air classification in a manner that results in selectively grinding the free carbon particles in the coarse fraction without reducing the particle size or affecting the characteristics of the ash particles in coarse fraction.

Electrostatic means for removing carbon from a fly ash/carbon mixture are disclosed in U.S. Pat. No. 4,357,234, U.S. Pat. No. 4,514,289, and U.S. Pat. No. 4,517,078. Generally, in each of these processes, separation is achieved by subjecting the fly ash/carbon mixture to a directional electrostatic force which causes the lighter, more highly charged carbon particles to move in a direction different from that of the heavier, less charged siliceous particles thereby dividing the material into a high-carbon fraction and a low-carbon fraction. Another electrostatic method for removing carbon from fly ash, disclosed in U.S. Pat. No. 4,556,481, involves maintaining the fly ash/carbon mixture in a fluidized state while subjecting the fluidized material to an electrostatic field that imparts a centrifugal force to the more highly charged carbon particles and causes the carbon-rich fraction to move in a direction different from that of the low-carbon siliceous fraction. U.S. Pat. No. 4,115,256 discloses electrostatic separation of carbon and siliceous ash particles including upgrading the carbon fraction by passing said fraction through a cross-flow of ionized air.

A means of removing carbon from fly ash by flotational means, disclosed in U.S. Pat. No. 4,121,945, involves initially screening a fly ash/carbon mixture to remove coarse particles, removing a significant portion of the carbon from the mixture via froth flotation to create a low-carbon siliceous fraction, and grinding the low carbon siliceous fraction to further improve its pozzolanic properties. U.S. Pat. No. 4,426,282, U.S. Pat. No. 5,047,145, and U.S. Pat. No. 5,227,047 describe multi-step methods in which the carbon content of fly ash/carbon mixtures is reduced using wet flotation means which do not involve initial coarse screening.

Although all of the aforementioned may be used to remove carbon particles from siliceous fly ash, the efficiency and degree of removal achieved and the pozzolanic properties of the resulting low-carbon siliceous fraction are highly dependent upon the physical characteristics of the original ash. Further, these methods are not capable of efficiently recovering carbon entrapped in or tightly adhered to the siliceous ash particles or freeing and retaining siliceous material combined with or tightly adhered to carbon particles.

There remains, therefore, a need for an energy efficient, effective, economical method and apparatus for removing and recovering free and combined carbon from a fine ash/carbon mixture that increases the yield of both the low-carbon siliceous fraction and recovered carbon and improves the pozzolanic properties of the siliceous fraction in order to enhance its application as a constituent in concrete, shaped building products, and other materials of construction. The availability of such a method and apparatus would greatly increase the value and level of consumption of processed ash utilized as an additive in concrete and significantly decrease the volume of ash that must be disposed in landfills.

SUMMARY OF THE INVENTION

The present invention has met the hereinabove described needs. The invention provides an efficient, cost-effective method for reducing the carbon content of a combustion ash/carbon mixture that removes a substantial portion of both the free and combined carbon particles from the mixture and improves the performance of the remaining low-carbon siliceous ash as an ingredient in concrete, shaped building products, and other materials of construction. The carbon removal is preferably accomplished by comminuting an ash/carbon mixture in order to simultaneously alter the size and shape of the contained carbonaceous and siliceous particles, liberate carbon particles combined with or adhered to siliceous particles, and/or liberate siliceous particles combined with or adhered to carbonaceous particles therein, and separating the resulting carbonaceous and siliceous particles by means of classification in a gas stream. Comminution and particle separation are preferably achieved simultaneously in a single apparatus but may also be achieved sequentially in a single piece of equipment or in two or more separate pieces of equipment.

The invention also includes an apparatus for reducing the carbon content of a combustion ash containing siliceous ash particles and carbon particles. The apparatus includes comminution means for reducing the particle size of the siliceous ash particles and the carbon particles. The apparatus further includes separation means for separating a comminuted portion of the carbon particles from the siliceous ash particles by subjecting the comminuted combustion ash to a flow of gas which separates the carbon particles from the siliceous ash particles to obtain the combustion ash having reduced carbon content.

It is an object of this invention to achieve removal of carbon from an ash/carbon mixture to a level that enhances the characteristics of the mixture as an ingredient in concrete, shaped building products, and other materials of construction.

It is another object of this invention to separate a desired amount of carbon from an ash/carbon mixture while minimizing the quantity of fly ash particles separated therewith.

It is a further object of this invention to reduce the carbon content of an ash/carbon mixture to less than 6% by weight, and preferably to 4% by weight or less.

It is a further object of this invention to reduce the carbon content of an ash/carbon mixture using commercially available and economical processing equipment.

It is a further object of this invention to achieve removal of carbon from an ash/carbon mixture without first incorporating the mixture into a liquid medium.

It is a further object of this invention to achieve removal of carbon from an ash/carbon mixture in a manner that improves the pozzolanic properties of the resultant product.

It is also an object of this invention to provide an apparatus for reducing the carbon content of a combustion ash in order to obtain a combustion ash of reduced carbon content.

It is a further object of the invention to provide a method of making concrete by employing a reduced carbon cement.

These and other objects of the invention will be more fully understood from the following detailed description of the invention and reference to the illustrations appended hereto.

DESCRIPTION OF PREFERRED EMBODIMENTS

As employed herein, the expression "ash" will refer to the solid product resulting from the combustion of coal or other siliceous materials.

As employed herein, the terms "siliceous ash" and "siliceous particles" will refer to ashes and particles containing oxides of silicon which may or may not contain oxides of other metals including, but not limited to, calcium, aluminum, iron, and copper.

As employed herein, the expression "fly ash" will refer to fine particles of ash that are carried from a combustion chamber by gaseous combustion products and subsequently separated therefrom.

As employed herein, the expression "bottom ash" will refer to particles of ash that remain in the combustion chamber during combustion and are subsequently removed therefrom.

As employed herein, the term "air classification" shall refer to classifying ash particles by subjecting the ash to a controlled directional stream of air or other gas in order to separate the various particle classes within the ash on the basis of the particle size and/or density of each class.

As employed herein, the term "cement" shall refer to cement, as is known, or other suitable binders used to create a concrete mixture and/or concrete.

By combining comminution of carbon-containing siliceous ashes with air classification of the comminuted ash mixture, the present invention facilitates separation of the carbonaceous particles and the siliceous particles contained in the original ash mixture. This improvement is achieved by grinding both the carbon and siliceous particles contained in the ash in order to minimize the differences in the relative size and shape of the carbonaceous and siliceous particles, thereby assuring that the separation is based primarily on the density differential between the lower density carbon particles and the higher density siliceous particles. This improved separation can be achieved in a number of ways.

Figure 1:
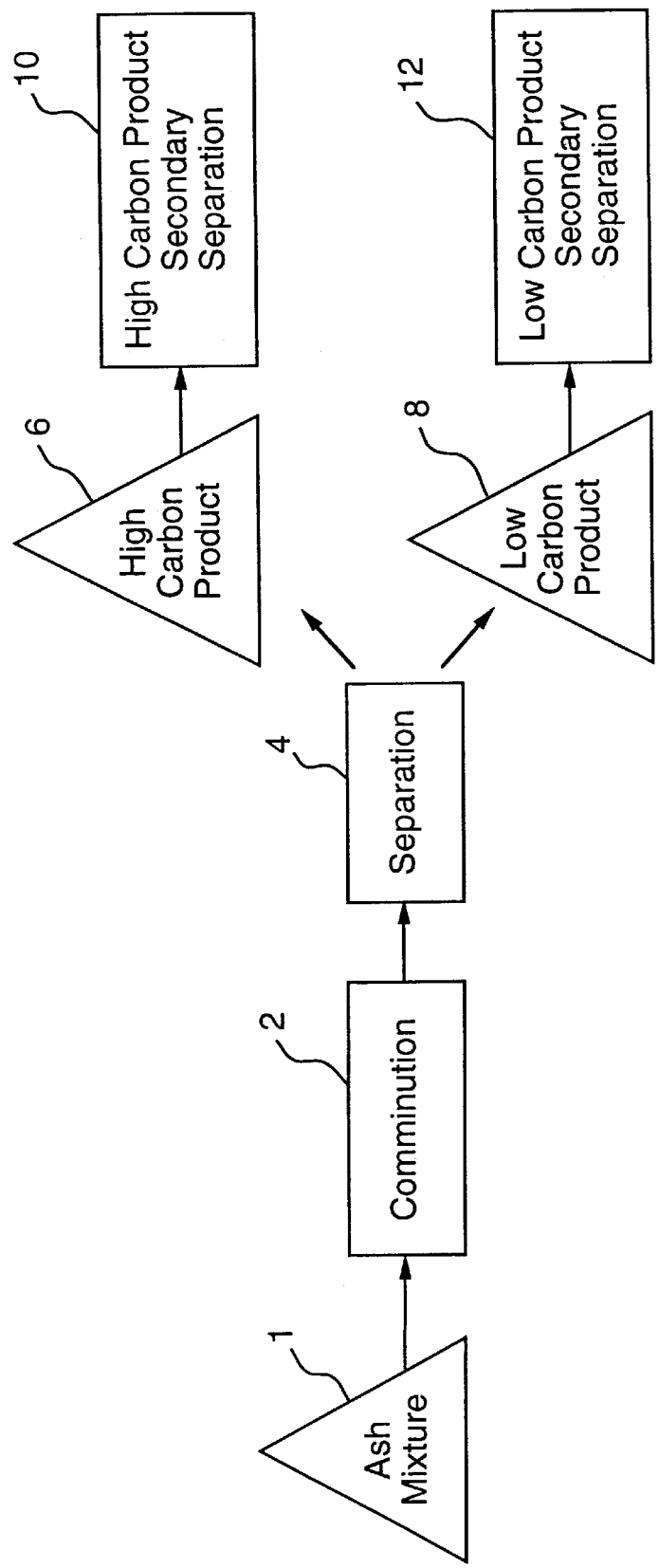
FIG. 1 is a block diagram of an embodiment of the present invention wherein comminution and separation are performed sequentially.

FIG. 1 illustrates an embodiment of the present invention wherein the carbon content of an as-combusted ash mixture 1 comprising carbonaceous particles and siliceous particles is reduced by sequentially comminuting the ash mixture 2 and separating the comminuted ash 4 into a high-carbon portion 6 and a low-carbon portion 8. Comminution of the ash may be achieved using mechanical means, including but not limited to ball milling, rod milling, hammer milling, or other mechanical means that achieve the desired degree of comminution; vibratory milling; and/or autogenous grinding. Upon completion of comminution, a desired portion of the lower density carbonaceous particles may be separated from the higher density siliceous particles using air classification means such as dry fluid bed separation, a combination of vibration and directional air flow of the type heretofore described in reference to U.S. Pat. No. 5,299,692, and or by means of single stage and multiple stage air classifiers such as the Air Stream, Single Wheel, and Multi-wheel classifiers manufactured and sold commercially by Hosokawa Micron Powder Systems of Summit, New Jersey, U.S.A., and classifiers similar thereto.

Upon completion of the separation step 4, the separated high-carbon portion 6 and the low-carbon portion 8 are stored prior to reuse or disposal. Optionally, the carbon content of high-carbon portion 6 may be increased and additional low-carbon material may be obtained by subjecting high-carbon portion 6 to secondary separation 10. Similarly, the value of low-carbon portion 8 may be enhanced and additional high-carbon material obtained by subjecting low-carbon portion 8 to secondary separation 12. Secondary separation of both portions may be achieved using the heretofore mentioned air classification means, froth flotation, or any means suitable for further separating the siliceous and carbonaceous fractions in the comminuted and classified products initially recovered from the ash mixture.

Figure 2:
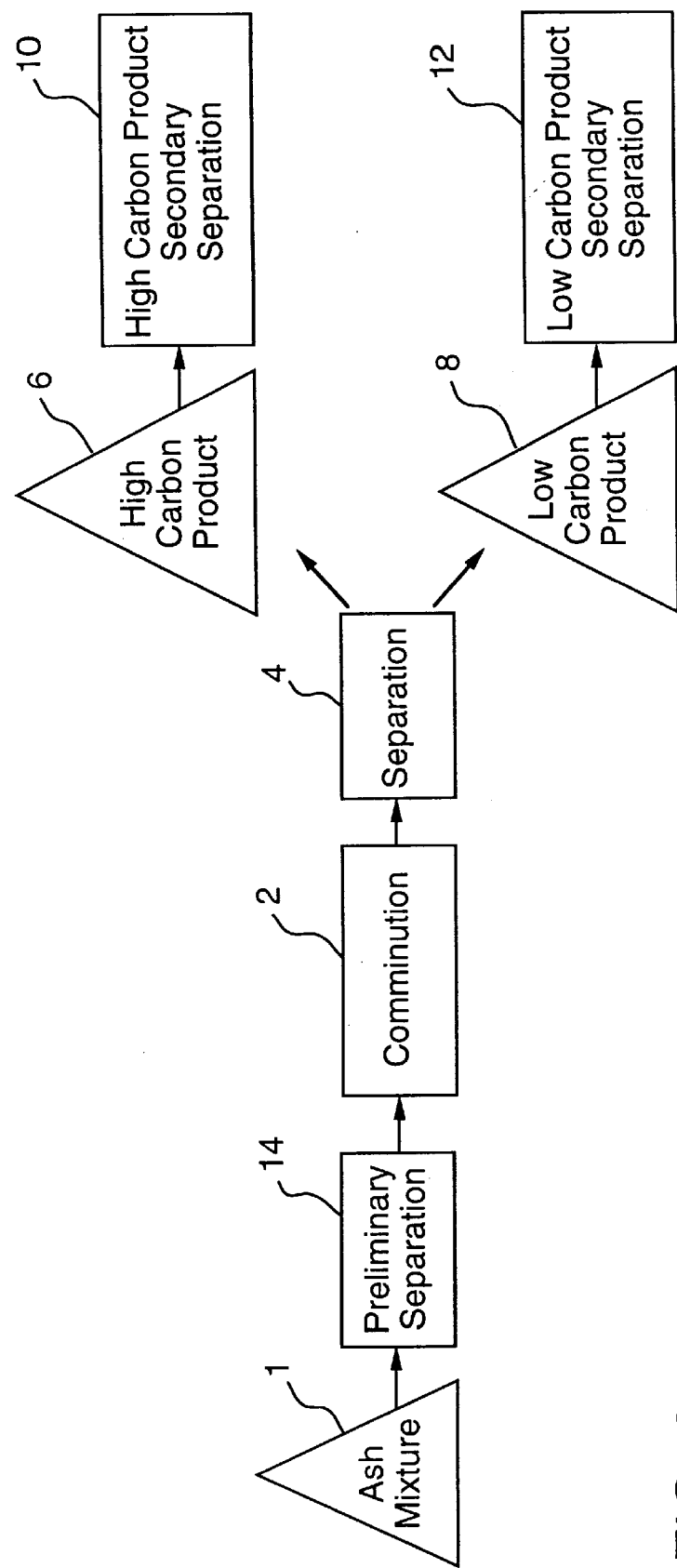
FIG. 2 is a block diagram of an embodiment of the present invention wherein sequential comminution and separation are preceded by removal of coarse particles from the ash mixture.

FIG. 2 illustrates a second embodiment of the invention wherein a preliminary separation step 14 is incorporated into the process illustrated in FIG. 1 in order to remove a portion of the most coarse particles from the ash mixture prior to comminution 2 of the ash. Incorporation of separation step 14 reduces the time required for comminution 2 and improves the efficiency and effectiveness of separating the carbonaceous particles from the siliceous particles in the ash mixture during the separation step 4.

It is preferred that comminution and separation be performed simultaneously by means of combining mechanical or autogenous grinding and size classification of the comminuted particles in a stream of air or a gas in a single operation. It is most preferred that such simultaneous comminution and classification involves autogenous grinding of the ash. This can best be accomplished by employing equipment which combines opposed jet mill comminution and air classification in a single piece of equipment. Devices to accomplish this, such as the Model 400 AFG series of fluidized jet mills produced and sold commercially by Hosokawa Micron Powder Systems of Summit, New Jersey, U.S.A. and associated companies, are available commercially.

Figure 3A:
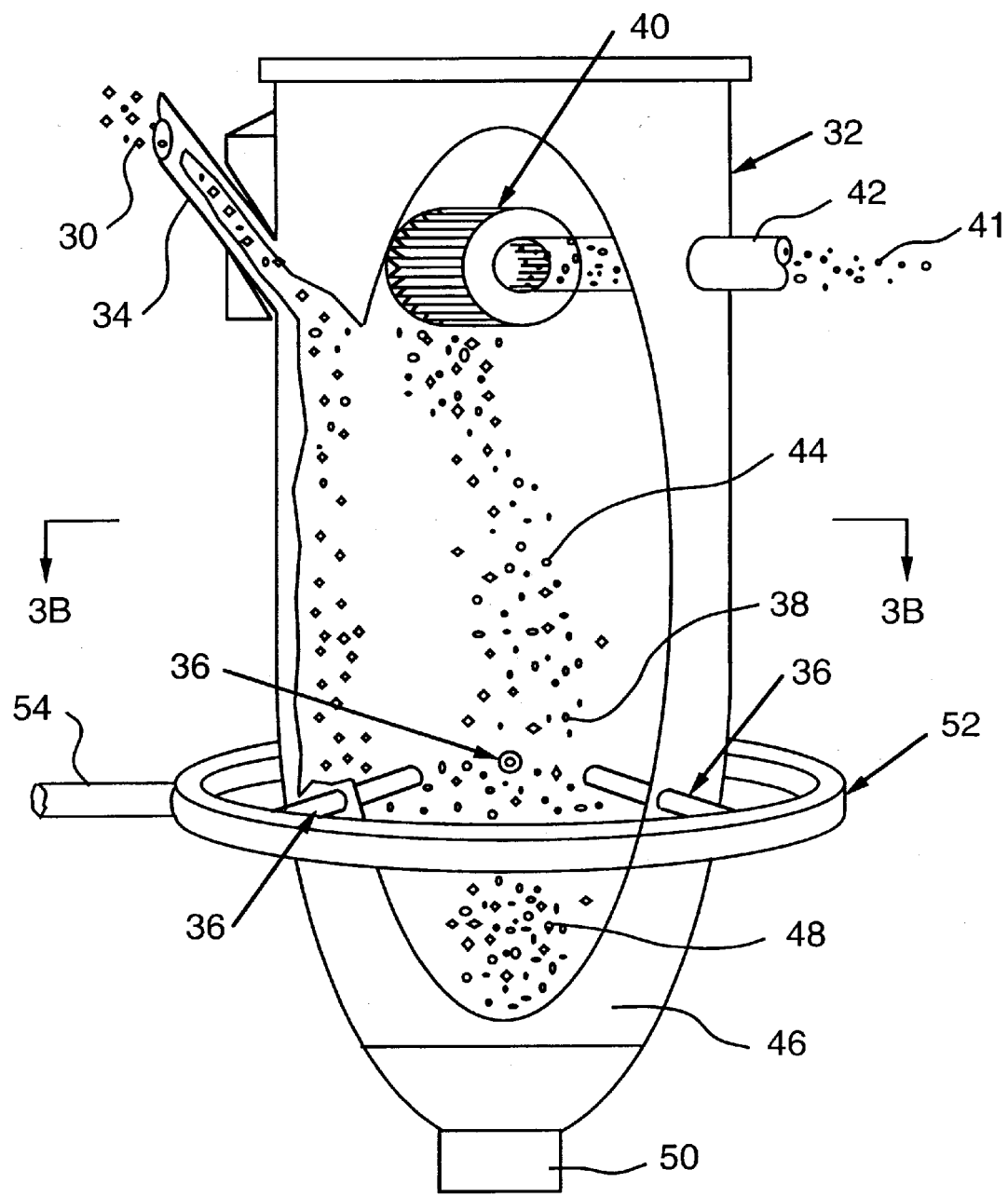
FIG. 3A is a schematic view in vertical section of an embodiment of the present invention wherein comminution and separation are performed simultaneously.
Figure 3B:
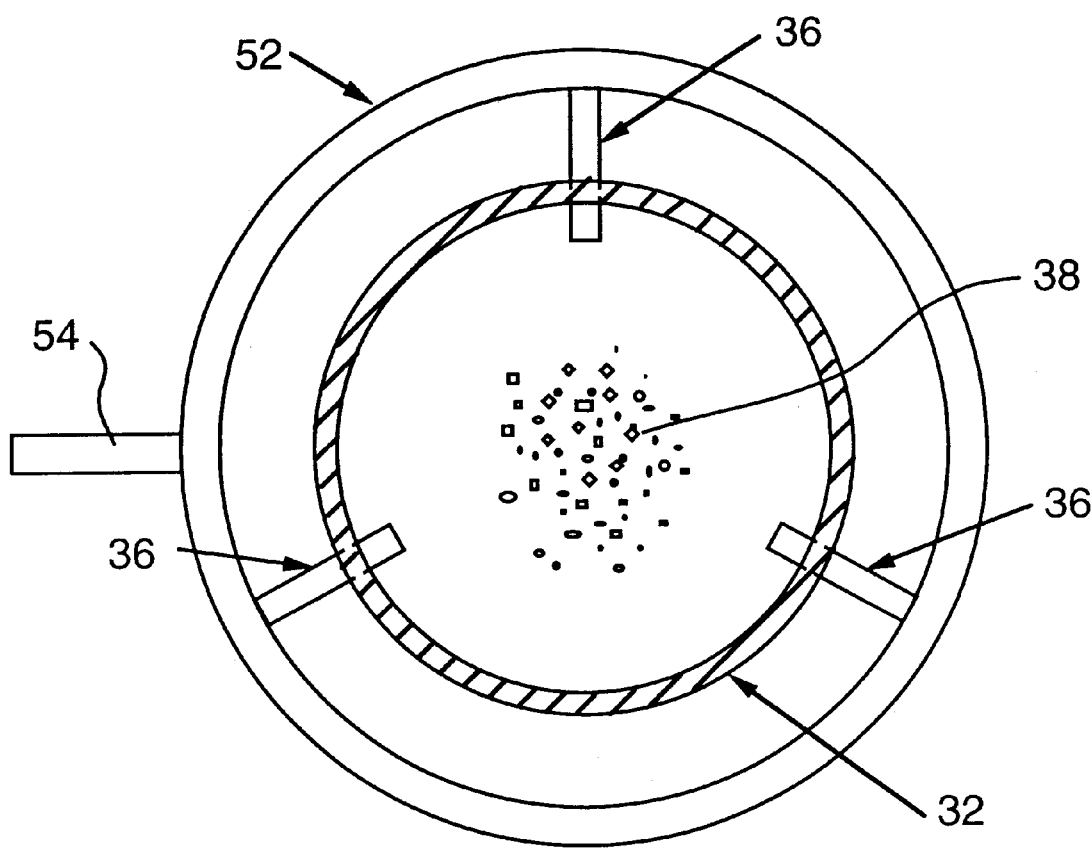
FIG. 3B is a vertical cross-section showing the comminution means of the embodiment shown in FIG. 3A

FIG. 3A illustrates a preferred embodiment of the present invention in which an ash mixture 30 is introduced into a combined grinder/classifier unit 32 in which autogenous grinding of the ash mixture is combined with air or gas classification of the comminuted particles in order to separate and remove a significant portion of the carbonaceous particles from the siliceous particles in the ash. The combination grinder/classifier 32 comprises an input means 34 through which the ash mixture 30 enters the unit, two or more air jet nozzles 36 positioned such that the jets of pressurized air or gas leaving each nozzle converge at a single point 38 located essentially equidistant from the innermost surface of each nozzle. The grinder/classifier 32 also contains a classifying rotor 40 of the type hereinafter described through which the finer and less dense particles 41 of comminuted material 44 pass, a collection passage 42 through which the finer and less dense particles 41 are transported as they exit said grinder/classifier, and a collection chamber 46 in which the coarser, more dense particles 48 of comminuted ash that fail to pass through the classifying rotor 40 are collected for subsequent discharge through discharge means 50.

Figure 4:
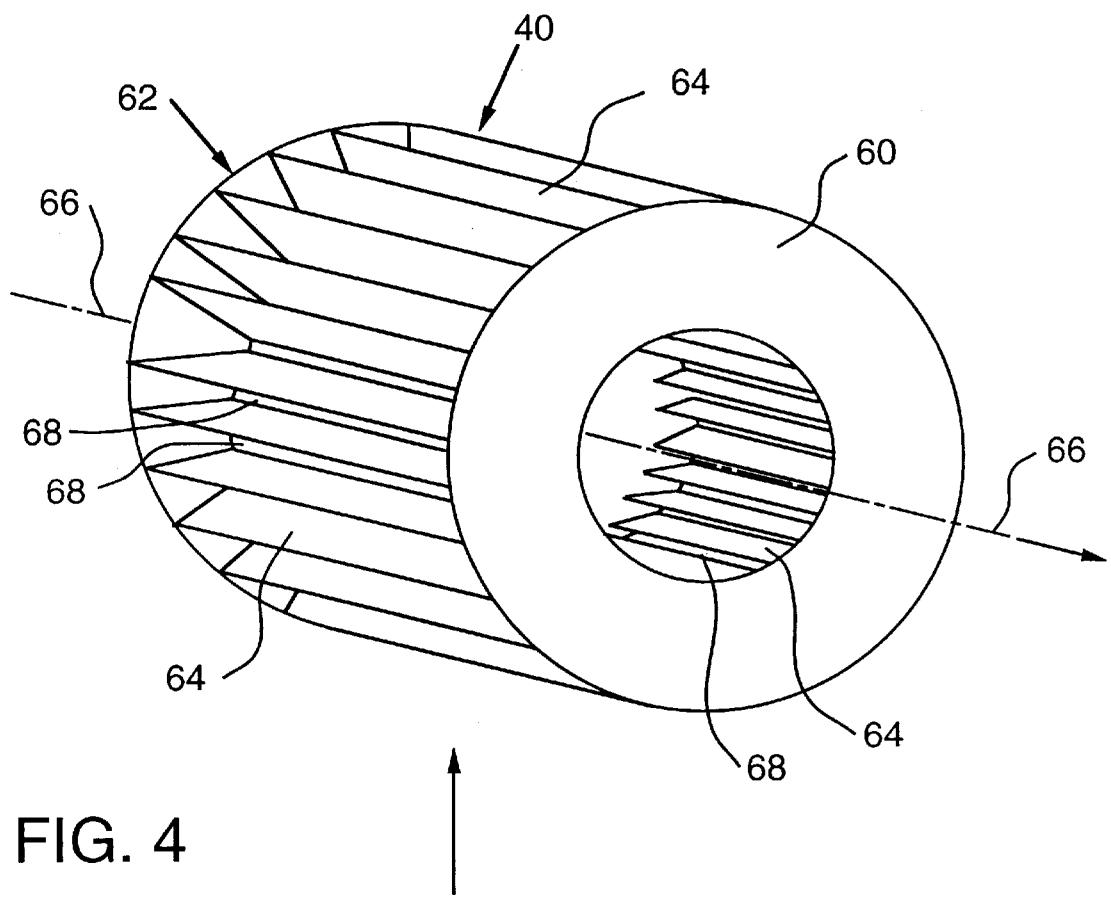
FIG. 4 is a schematic view of the classification component utilized to classify and separate the particulate components of the ash in accordance with the embodiment shown in FIG. 3 and FIG. 3A.

Classifying rotor 40, illustrated in detail in FIG. 4, is essentially cylindrical and comprises two end plates 60,62 connected by multiple blades 64 positioned essentially parallel to the axis of rotation 66 of said cylindrical rotor and circumferentially spaced from each other such that a space 68 is formed between each blade 64. As classifying rotor 40 rotates about axis 66, spaces 68 permit the finer and less dense particles 41 of specific size and density to pass between blades 64 and be subsequently discharged from grinder/classifier 32 through fine material passage 42, as illustrated in FIG. 3A.

Referring to FIG. 3A and FIG. 4, when air is used for autogenous grinding and particle classification and separation, air jet nozzles 36 are connected to manifold 52 which supplies pressurized air to each said nozzle. Manifold 52, in turn, is connected to a supply of pressurized air (not shown) through air supply means 54. Air jet nozzles 36 are normally configured and positioned such that the velocity and momentum of the air leaving the nozzles creates a flow pattern that draws the carbonaceous and siliceous ash particles in the ash mixture 30 into the center of each jet where they are accelerated to the impact velocity required to achieve some degree of particle comminution when said particles impact each other in the general area of air jet convergence point 38. From said point of convergence, the pressure differential between the pressurized air emanating from air jet nozzles 36 located in the lower portion of the grinder/classifier unit 32 and lower pressure air passing through classifying rotor 40 and discharged through material passage 42 in the upper portion of said unit creates an upwardly flowing stream of air that carries the finer and/or less dense particles 41 of comminuted material 44 upward toward classifying rotor 40. The size of the fine and less dense particles 41 able to pass through the spaces 68 between blades 64 of classifying rotor 40 depends upon the speed of rotation of said rotor, the dimensions of spaces 68, and the upward momentum of the finer and less dense particles 41 which, in turn, is controlled by the particle size and density of said fine comminuted particles and the velocity of the upwardly flowing air stream. The particles entering classifying rotor 40 through spaces 68 exit grinder/classifier unit 32 through material collection passage 42. The particles which do not have sufficient momentum to pass through spaces 68 are drawn downward by gravity into the previously described lower autogenous grinding region where they are again entrained in the pressurized air streams exiting the nozzles 36, and the comminution process is repeated until the desired degree of comminution and separation of carbonaceous and siliceous ash particles in the ash mixture 30 is achieved.

The degree of comminution achieved during autogenous grinding is controlled to a large degree by the velocity of the pressurized air streams exiting the air jet nozzles 36 which, in turn, is controlled by nozzle configuration, including length and air passage diameter, the pressure of the air supplied to said nozzles through air supply manifold 52, the number of nozzles employed, and the orientation of the nozzles relative to each other. For particles of a given size and density, the greater the number air jet nozzles 36 employed and the higher the air pressure supplied to said nozzles, the greater the velocity at which the particles impact each other in the vicinity of convergence point 38 and the greater the degree of particle comminution attained. For commercial fly ash mixtures comminuted in autogenous grinding equipment similar to the aforementioned Hosokawa Model 400 AFG Fluidized Jet Mill, it has been determined that satisfactory comminution can be achieved employing at least three air jet nozzles 36 each having an air passage diameter of between six millimeters and ten millimeters and air pressures of greater than 20 psi. It is preferred to employ between three and twelve nozzles, each having an air passage diameter between six millimeters and eight millimeters and air pressures in the range of 45 pounds per square inch and 70 pounds per square inch. The optimum number of nozzles and the air pressure employed to achieve the desired comminution of a specific ash are normally determined by the size and shape of grinder/classifier 32, the size distribution and density of the ash particles, the diameter of the nozzle air passage, the length of the nozzles, and the orientation of the nozzles relative to each other. Air jet nozzles 36 may be positioned radially in a horizontal plane or in a plane angularly displaced from the horizontal by less than 90 degrees. In certain instances, the comminution of particles in ash mixture 30 may be enhanced by orienting at least one centrally positioned air jet nozzle vertically upward such that the air jet emanating from said nozzle intersects the air jets emanating from said horizontally oriented nozzles or angularly oriented nozzles at convergence point 38.

The ability of the finer and less dense particles 41 of comminuted material 44 to attain the upward momentum required to pass through the spaces 68 in classifying rotor 40 is controlled by the speed of rotation of said classifying rotor, the particle size and density of said finer and less dense particles, and the velocity of the upwardly flowing air stream in which the comminuted material 44 is suspended. The higher the speed of rotation of classifying rotor 40, the greater the momentum required for said finer and less dense particles 41 to pass through spaces 68 and exit the grinder/classifier 32. Accordingly, increasing the rotational speed of classifying rotor 40 under any given set of operating conditions, decreases the size and/or density of the finer and less dense particles 41 capable of passing through spaces 68 in said rotor whereas decreasing the speed of rotation permits removal of larger particles and particles of higher density from the system through material collection passage 42.

When employing autogenous grinding equipment similar to the aforementioned Hosokawa Model 400 AFG Fluidized Jet Mill, it has been determined that optimum removal of the lower density carbon-rich portion of ash mixture 30 can be achieved by rotating classifying rotor 40 at speeds capable of removing particles of the desired size and density from comminuted material 44. It is preferred that classifying rotor 40 be operated at speeds between 2,000 rpm and 6,000 rpm and more preferably in the range of 3,000 rpm and 5,000 rpm. When employing smaller autogenous grinding equipment that employ classifying rotors smaller than that of said Model 400 AFG, the speed of rotation of the rotor must be increased to achieve satisfactory separation. A typical classifier rotor speed for a smaller jet mill similar to a Hosokawa Model 100 AFG jet mill is in the range of 20,000 to 25,000 rpm.

It has been further determined that the time required to achieve a desired degree of carbon removal from a fly ash mixture 30 may be significantly reduced by classifying the particles of comminuted material 44 suspended in the aforementioned upwardly flowing air stream in two stages. In this embodiment of the present invention, classifying rotor 40 is initially rotated at a relatively high speed in order to limit the quantity of the finer and less dense particles 41 of comminuted material 44 that are capable of passing through spaces 68 in said rotor, thereby causing the vast majority of said finer and less dense material to fall under the influence of gravity back into the comminution zone in the lower portion of grinder/classifier 32 where said finer and less dense particles are subjected to further autogenous grinding. This additional comminution of finer and less dense particles 41 results in more quickly achieving greater uniformity of particle size of the carbonaceous and siliceous ash particles in the comminuted ash mixture. Upon achieving the desired particle size distribution in said comminuted ash mixture, the rotational speed of classifying rotor 40 is reduced. This speed reduction reduces the momentum required for the finer and less dense particles 41 carried upwardly by the air flow in the upper portion of grinder/classifier 32 to pass through spaces 68 in said rotor which, in turn, speeds removal of the finer and less dense particles from fine comminuted material mixture 44 and favors removal of the lower density carbonaceous particles from higher density siliceous particles in said fine comminuted material. It has also been determined that, when employing the aforementioned Hosokawa Model 400 AFG Fluidized Jet Mill for such two-stage classification, a significant decrease in comminution time can be achieved utilizing an initial high rotational speed in the range of 5,500 rpm to 6,000 rpm and a subsequent lower rotational speed preferably in the range of 3,000 rpm to 5,000 rpm. The optimal high and low speeds of rotation of classifying rotor 40 rotor utilized to achieve the desired degree of comminution and separation are dependent upon the outer diameter of said rotor and the size of the spaces 68 between the rotor blades 64 therein and must be established based upon the characteristics of ash mixture 30 being ground and the type of grinding and separation equipment employed.

Increasing the temperature of the pressurized air or gas passing through jet nozzles 36 further decreases the time required to achieve the desired degree of comminution and separation. In this embodiment of the present invention, it is preferred that the temperature of said pressurized air or gas be at least 70 degrees Centigrade (158 degrees Fahrenheit) and most preferred that the temperature be maintained between 100 degrees Centigrade (212 degrees Fahrenheit) and 200 degrees Centigrade (392 degrees Fahrenheit).

It has further been discovered that the time required to achieve the desired comminution and separation of carbonaceous and siliceous ash particles within an ash mixture may also be reduced by removing the more coarse particles from the as-combusted ash prior to subjecting the ash to simultaneous comminution and air classification. The size of the particles to be removed in order to reduce the time required for comminution and separation of the comminuted particles depends upon the characteristics and particle size distribution of the as-combusted ash. The removal of such coarse particles may be accomplished by screening, electrostatic, dry fluid bed separation, centrifugal separation, or any other means known to those skilled in the art. The minimum particle size that may subject to removal by any of the aforementioned means in order to reduce the time required for comminution and separation is approximately 73 microns (200 mesh).

While for convenience the above discussion and illustrations have made reference to simultaneous autogenous grinding and air classification performed in a single apparatus, it will be apparent to those skilled in the art that the invention may be practiced by means of sequential autogenous grinding and air classification operations employing dedicated equipment for each operation.

While for convenience the above discussion and illustrations have made reference to removing carbonaceous particles from fly ash mixtures, it will be apparent to those skilled in the art that the method of the present invention may be employed to comminute and separate carbonaceous particles from bottom ash mixtures and improve the pozzolanic characteristics thereof.

The following examples provide specified preferred practices in employing the methods of this invention.

EXAMPLE 1

This example illustrates that satisfactory carbon removal from coal combustion fly ash can be achieved by a combination of mechanical comminution and air classification and that the total carbon content in the treated ash can be reduced to below 6%, as measured in accordance with standard ASTM loss-on-ignition procedures (6% LOI), the level required to make the treated ash suitable for use in concrete and other construction products.

The fly ash utilized in this example was a representative sample of ash resulting from the combustion of coal at a commercial power generating plant. The total carbon content of the as-generated ash, as determined by standard loss-on-ignition analysis, was 8.5% LOI.

In this example, five 2.2-pound (1 kilogram) samples of the ash were subjected to mechanical comminution via ball milling. The samples were then combined by blending and a 0.23 pound (0.1 kilogram) sampled of the blended material was separated into a high-carbon fraction and a low-carbon fraction via air classification utilizing an Alpine Model 50 ATP air classifier produced commercially by Alpine Aktiengelleschaft, a division of the Hosokawa Micron Group of companies. Ball milling was performed in a an eight-inch diameter (8" D)×9.5-inch long (9" L) ball mill rotated at 35 rotations per minute (35 rpm) for a period of 30 minutes. Air classification was performed utilizing an air classifier wheel speed of 22,000 rpm and an air pressure of approximately 3.6 millibar (0.05 psi) for a period of five minutes.

Upon completion of the classification step, the carbon content of the coarser and more dense portion of the comminuted ash remaining in the classifier after completion of the classification step was determined by standard loss-on-ignition analysis. The results of this analysis showed that the carbon content of said coarser and more dense portion, which was intended to be the low-carbon portion suitable for use in concrete and other construction products, had been reduced to a total of 3.0% LOI.

This example clearly demonstrates that, by utilizing a combination of mechanical comminution and air classification, the carbon content of coal combustion fly ash can be reduced below the maximum 6% LOI level and preferred 4% LOI level required for utilization of the treated ash as a component in concrete, shaped building products, and other construction materials.

EXAMPLE 2

This example illustrates that satisfactory carbon removal from coal combustion fly ash can be achieved by a combination of autogenous comminution and simultaneous air classification and that the total carbon content in the treated ash can be reduced to below 6%, as measured in accordance with standard ASTM loss-on-ignition procedures (6% LOI), the level required to make the treated ash suitable for use in concrete and other construction products.

The fly ash utilized in this example was the same representative sample of commercial power plant coal combustion ash utilized in Example 1. The total carbon content of the as-generated ash, as determined by standard loss-on-ignition analysis, was 8.5% LOI.

In this example, a 0.39 pound (0.175 kilogram) sample of the as-generated ash was subjected to simultaneous comminution by autogenous grinding and separation via air classification utilizing a commercially available Alpine Model 100 AFG air jet mill manufactured by Alpine Aktiengelleschaft, a division of the Hosokawa Micron Group of companies, in order to separate the comminuted ash into a high-carbon portion and a low-carbon portion. The aforesaid jet mill was configured with three 2.5 millimeter air jet nozzles. Comminution was achieved utilizing an air pressure of 40 psi and air classification was achieved utilizing a classifying rotor speed of 22,000 rpm. Simultaneous autogenous grinding and air classification were performed for a period of five minutes.

Upon completion of the simultaneous comminution and classification, the carbon content of the coarser and more dense portion remaining in the jet mill and the finer and less dense portion of the comminuted ash mixture removed from the classifier during operation were determined by standard loss-on-ignition analysis. The results of these analyses showed that the carbon content of said coarser and more dense portion, which was intended to be the low-carbon portion suitable for use in concrete and other construction products, had been reduced to a total of 5.2% LOI, whereas the carbon content of the finer and less dense portion had increased to a total of 19.4% LOI.

This example clearly demonstrates that, by utilizing simultaneous autogenous comminution and air classification, the carbon content of coal combustion fly ash can be reduced below the maximum 6% LOI level required for utilization of the treated ash as a component in concrete, shaped building products, and other construction materials.

EXAMPLE 3

This example illustrates that increasing the temperature of the air utilized for autogenous grinding in a standard air jet mill decreases the comminution/classification time required to achieve satisfactory carbon removal from coal combustion fly ash subjected to a simultaneous autogenous grinding comminution and air classification. It further illustrates that the total carbon content in the treated ash can be reduced to below 6%, as measured in accordance with standard ASTM loss-on-ignition procedures (6% LOI), the level required to make the treated ash suitable for use in concrete and other construction products.

The fly ash utilized in this example was a commercially generated power plant coal combustion ash having total carbon content of 12.3% LOI, as determined by standard loss-on-ignition analysis. The ash was subjected to two process cycles differing only in the temperature of the air entering the unit. Both cycles were performed, using the commercially available Hosokawa Model 400 AFG fluidized jet mill, utilizing an air pressure of 45 psi and a classifier wheel speed of 5,500 rpm. The first of said cycles was performed using air at a temperature 70° F. (21° C.), and the second cycle was performed using air at a temperature of 295° F. (146° C.). Samples of the coarser and more dense low-carbon portion of the comminuted ash remaining in the jet mill; i.e., the portion suitable for use as a component in various construction products, were taken at times of 10 minutes and 20 minutes under each condition of air temperature.

The results of the above tests, illustrated in Table 1, show that the carbon content of the low-carbon portion the comminuted ash processed for 10 minutes at 70° F. (21° C.) was 7.2%, whereas the carbon content of the same ash processed for 10 minutes at 295° F. (146° C.) was 5.7%. Similarly, the carbon content of the low-carbon portion the comminuted ash processed for 20 minutes at 70° F. (21° C.) was 5.2%, whereas the carbon content of the same ash processed for 20 minutes at 295° F. (146° C.) was 3.6%

TABLE 1

| Processing Time | Carbon Content of Ash Processed at 70° F. (21° C.) | Carbon Content of Ash Processed at 295° F. (146° C.) |
|---|---|---|
| 10 minutes | 7.2% LOI | 5.7% LOI |
| 20 minutes | 5.2% LOI | 3.6% LOI |

The results shown in Table 1 clearly illustrate that the time required to achieve the desired carbon content in a treated coal combustion fly ash can be reduced by increasing the temperature of the air utilized for comminution and classification.

While many formulations for concrete are known, common to most of them will be a cement or binder, water, and an aggregate material. An example of a suitable formula is: 24.2 weight percent of sand, 59.2 weight percent of coarse aggregate, 5.5 weight percent of water, 9.4 weight percent of cement and 1.7 weight percent of ash.

While for simplicity of illustration, reference has been made to the use of air as the gaseous medium for autogenous grinding for comminuting both siliceous ash and carbon in an ash/carbon mixture and removing the carbonaceous particles therefrom, it will be appreciated that the invention may also be practiced using other gases that perform in a similar manner.

While for simplicity of illustration, reference has been made to specific forms of mechanical comminution to reduce the size of the siliceous particles and carbonaceous particles in an ash/carbon mixture, it will be appreciated that the invention may be practiced utilizing other forms of mechanical comminution.

While for simplicity of illustration, reference has been made to employing single comminution and particle classification steps in practicing the invention, it will be appreciated that the invention may also be practiced using multiple comminution and classification steps.

While for simplicity of illustration, reference has been made to specific equipment configurations and dimensions, it will be appreciated that the invention may be practiced utilizing other equipment configurations and dimensions.

While for simplicity of illustration, reference has been made to the use of specific air pressures, velocities, and temperatures, it will be appreciated that the invention may be practiced utilizing other air pressures, velocities, and temperatures.

Whereas, particular embodiments of the invention have been described herein for the purposes of illustration, it will be evident to those skilled in the art that numerous variations of the details may be made without departing from the invention as set forth in the appended claims.

I claim:

1. A method for reducing the carbon content of a combustion ash containing siliceous ash particles and carbon particles comprising:

subjecting said combustion ash to comminution to reduce the particle size of said siliceous ash particles and said carbon particles;

separating a portion of said carbon particles from said combustion ash by subjecting the comminuted combustion ash to a flow of gas which separates said portion of said carbon particles from said siliceous ash particles to obtain said combustion ash with reduced carbon content; and effecting said comminution of said combustion ash by autogenous grinding.

2. The method of claim 1 including effecting said comminution of said combustion ash and said separating of said portion of said carbon particles in a unitary housing.

3. The method of claim 1 including employing as said combustion ash, ash produced by the combustion of coal.

4. The method of claim 1 including effecting said separating of said portion of said carbon particles based on the density differential between said siliceous ash particles and said carbon particles.

5. The method of claim 1 wherein said gas is air.

6. The method of claim 1 including creating said combustion ash of reduced carbon content with a carbon content of less than about 6 percent by weight of the combustion ash.

7. The method of claim 1 including creating said combustion ash of reduced carbon content with a carbon content of less than about 4 percent by weight of the combustion ash.

8. A method for reducing the carbon content of a combustion ash containing siliceous ash particles and carbon particles comprising:

subjecting said combustion ash to comminution to reduce the particle size of said siliceous ash particles and said carbon particles;

separating a portion of said carbon particles from said combustion ash by subjecting the comminuted combustion ash to a flow of gas which separates said portion of said carbon particles from said siliceous ash particles to obtain said combustion ash with reduced carbon content; and separating uncomminuted carbon particles from said combustion ash prior to said comminution of said combustion ash.

9. A method for reducing the carbon content of a combustion ash containing siliceous ash particles and carbon particles comprising:

subjecting said combustion ash to comminution to reduce the particle size of said siliceous ash particles and said carbon particles;

separating a portion of said carbon particles from said combustion ash by subjecting the comminuted combustion ash to a flow of gas which separates said portion of said carbon particles from said siliceous ash particles to obtain said combustion ash with reduced carbon content; and said gas is heated.

10. A method of creating a concrete mix comprising:

subjecting a combustion ash containing siliceous ash particles and carbon particles to comminution to reduce the particle size of the siliceous ash particles and said carbon particles;

separating a portion of said carbon particles from the combustion ash by subjecting the comminuted combustion ash to a flow of gas which separates said portion of carbon particles from the siliceous ash particles to obtain said combustion ash with reduced carbon content;

admixing said combustion ash with reduced carbon content with an aggregate material and cement to create the concrete mix; and effecting said comminution of said combustion ash by autogenous grinding.

11. The method of claim 10 including effecting said comminution of said combustion ash and said separating of said portion of said carbon particles in a unitary housing.

12. The method of claim 10 including employing as said combustion ash, ash produced by the combustion of coal.

13. The method of claim 10 including effecting said separating of said portion of said carbon particles based on the density differential between said siliceous ash particles and said carbon particles.

14. The method of claim 10 including creating said combustion ash with reduced carbon content having a carbon content of less than about 6 percent by weight of the combustion ash.

15. The method of claim 14 including creating said combustion ash with reduced carbon content having a carbon content of less than about 4 percent by weight of the combustion ash.

16. The method of claim 14 including adding water to said concrete mix and admixing the water therewith.

* * * * *